(12) United States Patent
Bhatia et al.

(10) Patent No.: US 10,409,380 B2
(45) Date of Patent: Sep. 10, 2019

(54) DYNAMIC HAPTIC CONVERSION SYSTEM

(71) Applicant: Immersion Corporation, San Jose, CA (US)

(72) Inventors: Satvir Singh Bhatia, Milpitas, CA (US); Juan Manuel Cruz Hernandez, Westmount (CA); Loc Tien Phan, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/184,360

(22) Filed: Nov. 8, 2018

(65) Prior Publication Data
US 2019/0073039 A1 Mar. 7, 2019

Related U.S. Application Data

(63) Continuation of application No. 14/469,832, filed on Aug. 27, 2014, now Pat. No. 10,162,416.
(Continued)

(51) Int. Cl.
*G06F 3/01* (2006.01)
*H04N 19/12* (2014.01)
(Continued)

(52) U.S. Cl.
CPC ........ *G06F 3/016* (2013.01); *G06F 2203/014* (2013.01); *H04N 19/12* (2014.11); *H04N 19/85* (2014.11); *H04N 19/98* (2014.11)

(58) Field of Classification Search
CPC .... G06F 3/016; G06F 3/167; G06F 2203/013; G06F 2203/014; G06F 2203/015; G06F 1/163; A63F 2300/1037
See application file for complete search history.

(56) References Cited

U.S. PATENT DOCUMENTS 5,684,722 A 11/1997 Thorner et al.
7,623,114 B2 11/2009 Rank
(Continued)

FOREIGN PATENT DOCUMENTS

EP 2479643 A1 7/2012
JP 2005506613 A 3/2005

OTHER PUBLICATIONS

Anonymous: Wikipedia, the free encyclopedia, "Transcoding", Feb. 27, 2013, pp. 1-13, http://en.wikipedia.org/w/index.php?tille=Transcoding&oldid=540873849, retrieved Aug. 15, 2014.
(Continued)

*Primary Examiner* — Dong Hui Liang
(74) *Attorney, Agent, or Firm* — Miles & Stockbridge P.C.

(57) ABSTRACT

A method for dynamically converting an input signal into a haptic signal that causes a haptic output device to output one or more haptic effects is provided. The method includes generating a plurality of effect objects that are orderable in any order at runtime, receiving an input signal including a data signal and metadata defining an order that the effect objects are applied to the data signal at runtime, applying the effect objects to the data signal based on the order, and sending the haptic signal to the haptic output device. The effect objects applied to the data signal include an effect object that determines a threshold magnitude value by mapping the data signal to one of a plurality of bins, and an effect object that applies a dynamic range compression algorithm to the data signal based on the threshold magnitude value.

20 Claims, 14 Drawing Sheets

Related U.S. Application Data

(60) Provisional application No. 61/874,920, filed on Sep. 6, 2013.

(51) Int. Cl.
  *H04N 19/85* (2014.01)
  *H04N 19/98* (2014.01)

(56) References Cited

U.S. PATENT DOCUMENTS

| | | |
|---|---|---|
| 7,979,146 B2 | 7/2011 | Ullrich et al. |
| 8,000,825 B2 | 8/2011 | Ullrich et al. |
| 8,378,964 B2 | 2/2013 | Ullrich et al. |
| 8,441,437 B2 | 5/2013 | Rank |
| 8,686,941 B2 | 4/2014 | Rank |
| 8,688,251 B2 | 4/2014 | Ullrich et al. |
| 8,717,152 B2 | 5/2014 | Bhatia et al. |
| 8,754,757 B1 | 6/2014 | Ullrich et al. |
| 8,754,758 B1 | 6/2014 | Ullrich et al. |
| 8,761,915 B2 | 6/2014 | Ullrich et al. |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 2002/0126860 A1 | 9/2002 | Staley |
| 2003/0067440 A1 | 4/2003 | Rank |
| 2006/0267677 A1 | 11/2006 | Fan |
| 2007/0080929 A1 | 4/2007 | Hardwick |
| 2009/0018843 A1 | 1/2009 | Kawashima |
| 2009/0096632 A1 | 4/2009 | Ullrich et al. |
| 2012/0092555 A1 | 4/2012 | Crockett et al. |
| 2012/0128178 A1 | 5/2012 | Fujii |
| 2012/0188180 A1 | 7/2012 | Yang et al. |
| 2012/0206246 A1 | 8/2012 | Cruz-Hernandez et al. |
| 2012/0306631 A1 | 12/2012 | Hughes |
| 2013/0054251 A1 | 2/2013 | Eppolito |
| 2013/0131851 A1 | 5/2013 | Ullrich et al. |
| 2013/0207917 A1 | 8/2013 | Cruz-Hernandez et al. |
| 2013/0265286 A1 | 10/2013 | Da Costa et al. |
| 2013/0318438 A1 | 11/2013 | Afshar |
| 2013/0335209 A1 | 12/2013 | Cruz-Hernandez et al. |
| 2014/0064516 A1 | 3/2014 | Cruz-Hernandez et al. |
| 2014/0118125 A1 | 5/2014 | Bhatia |
| 2014/0176415 A1 | 6/2014 | Buuck et al. |
| 2014/0292501 A1 | 10/2014 | Lim et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

OTHER PUBLICATIONS

Wikipedia, the free encyclopedia, "Dynamic range compression", Sep. 4, 2013, pp. 1-12, http://en.wikipedia.org/w/index.php?title=Dynamic_range_compression&oldid=571516361, retrieved on Nov. 27, 2014.
Steven W. Smith, Scientist and Engineer's Guide to Digital Signal Processing, 1997, 1st Edition, pp. 123-140 and 261-276.
Weddle et al., U.S. Appl. No. 14/019,606, filed Sep. 6, 2013.
Saboune et al, U.S. Appl. No. 141020,461, filed Sep. 6, 2013.
Saboune et al., U.S. Appl. No. 14/020,502, filed Sep. 6, 2013.
Cruz-Hernandez et al, U.S. Appl. No. 14/080,860, filed Nov. 15, 2013.
Cruz-Hernandez et al., U.S. Appl. No. 14/162,814, filed Jan. 24, 2014.
Lacroix et al., U.S. Appl. No. 14/246,817, filed Apr. 7, 2014.
Lacroix et al., U.S. Appl. No. 14/277,870, filed May 15, 2014.
Bhatia et al., U.S. Appl. No. 14/467,184, filed Aug. 25, 2014.

DYNAMIC HAPTIC CONVERSION SYSTEM

CROSS-REFERENCE TO RELATED APPLICATIONS

This application is a continuation of U.S. patent application Ser. No. 14/469,832, filed on Aug. 27, 2014, which claims priority to U.S. Provisional Patent Application Ser. No. 61/874,920, filed on Sep. 6, 2013, the disclosures of which are incorporated by reference herein in their entireties.

FIELD

One embodiment is directed generally to a device, and more particularly, to a device that produces haptic effects.

BACKGROUND

Electronic device manufacturers strive to produce a rich interface for users. Conventional devices use visual and auditory cues to provide feedback to a user. In some interface devices, kinesthetic feedback, such as active and resistive force feedback, and/or tactile feedback, such as vibration, texture, and heat, is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

A haptic effect developer can author a haptic effect for the device, and the device can be configured to output the haptic effect. In this scenario, different types of hardware can be capable of generating different types of haptic effects due to different hardware characteristics. For example, different types of actuators, such as eccentric rotating mass motor actuators, linear resonant actuators, and piezoelectric actuators, are capable of generating different types of haptic effects due to different electromechanical characteristics of the different actuators. In general, a haptic effect developer that wishes to author a haptic effect for a specific type of hardware is required to tailor the haptic effect for the specific hardware. If the haptic effect developer wishes to support multiple hardware types, the haptic effect developer generally has to author different haptic effects, in order to provide an optimal haptic experience for each hardware type. This can result in additional design time and effort involved with authoring haptic effects.

SUMMARY

Embodiments of the present invention advantageously provided a method for dynamically converting an input signal into a haptic signal that causes a haptic output device to output one or more haptic effects. The method includes generating a plurality of effect objects that are orderable in any order at runtime, receiving an input signal including a data signal and metadata defining an order that the effect objects are applied to the data signal at runtime, applying the effect objects to the data signal based on the order, and sending the haptic signal to the haptic output device. The effect objects applied to the data signal include an effect object that determines a threshold magnitude value by mapping the data signal to one of a plurality of bins, and an effect object that applies a dynamic range compression algorithm to the data signal based on the threshold magnitude value.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a system that performs conversion of an input signal, such as an audio signal, to a haptic signal by dynamically linking, or chaining, various haptic conversion algorithms (also identified as "effects"), where the output signal of one effect serves as an input signal of another effect. Thus, the system can order a set of effects in any order at run-time, and the set of effects can be extensible to include effects that are created subsequent to the creation of the set of effects. By generalizing and utilizing effects, the system can dynamically create a list of effects at run-time that can collectively create any haptic conversion algorithm.

In another embodiment, the system performs conversion of an input signal to a haptic signal by dynamically creating and updating a range (also identified as a "window") that defines a portion of the input signal based on a minimum and maximum magnitude value of the input signal, and by scaling the portions of the input signal that "fall within the window." Portions of the input signal that do not "fall within the window" are not scaled by the system. In one embodiment, the window includes a range of magnitude values that are greater than or equal to the minimum magnitude value and less than or equal to the maximum value. Portions of the input signal that include magnitude values that are greater than or equal to the minimum magnitude value and less than or equal to the maximum value fall within the window. Portions of the input signal that include magnitude values that are either less than the minimum magnitude value or greater than the maximum magnitude value do not fall within the window. Further, the system can frequently update the minimum and maximum magnitude values, and can further update the window based on the updated minimum and maximum magnitude values. Thus, the window can be a dynamic window.

Further, in another embodiment, the system can dynamically compress a haptic signal and stream the dynamically compressed haptic signal to a haptic output device. By dynamically compressing the haptic signal, the system can select a compression algorithm based on a round trip duration between the system and a client, one or more characteristics of the haptic signal, or a combination therein. Thus, the system can efficiently compress and stream the haptic signal for many different scenarios. Further, by streaming the haptic signal, the system can send or transmit the haptic signal to a remote device.

Figure 1:
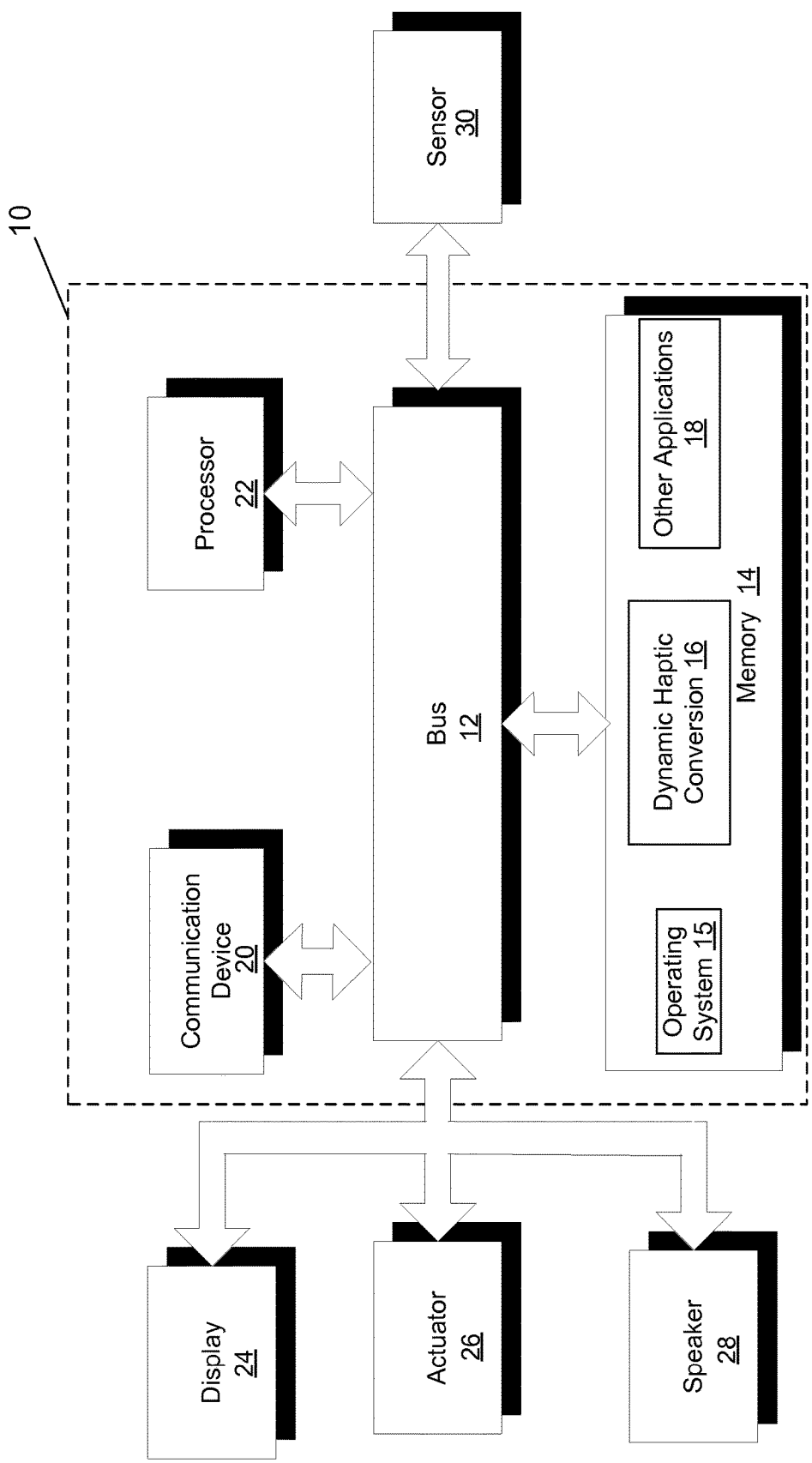
FIG. 1 illustrates a block diagram of a system in accordance with one embodiment of the invention.

FIG. 1 illustrates a block diagram of a system 10 in accordance with one embodiment of the invention. In one embodiment, system 10 is part of a device (e.g., a mobile device or a wearable device), and system 10 provides a dynamic haptic conversion functionality for the device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the aforementioned functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a dynamic haptic conversion module 16 that dynamically converts an input signal into a haptic signal, as disclosed in more detail below. In certain embodiments, dynamic haptic conversion module 16 can comprise a plurality of modules, where each module provides specific individual functionality for dynamically converting an input signal into a haptic signal. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electro-magnetic actuator, a voice coil, a shape memory alloy, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

In one embodiment, as previously described, a system can perform conversion of an input signal, such as an audio signal, to a haptic signal by dynamically linking, or chaining, various haptic conversion algorithms (i.e., effects). More specifically, according to the embodiment, the system can link, or chain, one or more effect objects that can be created at run-time. An effect object is an object, or module, that can include one or more computer-readable instructions that can cause the system to receive a signal as an input, perform a haptic conversion algorithm on the input signal to convert the input signal into an output signal (such as a haptic signal), and to output the output signal. A user of the system can determine which effect objects the system can link, or chain, and can further determine an order of the effect objects. In an example embodiment, a user can interact with a graphical user interface of the system to select one or more effect objects, and to select an order of the effect objects. Such interactions can include: selecting one or more "radio buttons" or "check boxes" displayed within the graphical user interface; "dragging and dropping" one or more effect objects into a pipeline displayed within the graphical user interface," or any other interaction with a graphical user interface that is known to one of ordinary skill in the relevant art. Further, each haptic conversion algorithm can either be performed in real-time (or near real-time), or can be performed offline (i.e., before, or independent of, a playback of an original input signal).

Previously, most haptic conversion algorithms have included specific processing chains that are static. For example, a haptic conversion algorithm could be defined as a filter conversion algorithm, such as a low-pass filtering algorithm that is applied to an input signal with a 500 hertz ("Hz") cutoff, extracting all relevant frequencies below 500 Hz, followed by a peak detection conversion algorithm that is applied to the filtered input signal. In contrast, according to an embodiment, the system can order a set of effects in any order at run-time, and the set of effects can be extensible to include effects that are created subsequent to the creation of the set of effects. By generalizing and utilizing effects, the system can dynamically create a list of effects at run-time that can collectively create any haptic conversion algorithm.

In one embodiment, the input signal can be an audio signal, or other type of audio input, that includes audio data. In an alternate embodiment, the input signal can be a video signal, or other type of video input, that includes video data. In yet another alternate embodiment, the input signal can be an acceleration signal, or other type of acceleration input, that includes acceleration data. In yet another alternate embodiment, the input signal can be a haptic signal, or other type of haptic input, that includes haptic data. In yet another alternate embodiment, the input signal can be an orientation signal that includes orientation data, an ambient light signal that includes ambient light data, or another type of signal that can be sensed by a sensor. Further, in other alternate embodiments, the input is not an input signal, but is another type of input that contains data.

Further, in one embodiment an effect can be any haptic conversion algorithm that is known to one of ordinary skill in the relevant art to convert an input signal into a haptic signal. For example, an effect can be a peak-detection haptic conversion algorithm that identifies a maximum amplitude value for each portion of an input signal, and generates a haptic signal for each portion of the input signal based on the identified maximum amplitude value where the identified maximum amplitude value defines a magnitude of the haptic signal. As another example, an effect can be a low-pass filter haptic conversion algorithm that filters out a portion of the input signal (e.g., a portion of the input signal with the highest frequency values), and generates a haptic signal based on the remaining portion of the input signal. As yet another example, an effect can be a high-pass filter haptic conversion algorithm that filters out a portion of the input signal (e.g., a portion of the input signal with the lowest frequency values), and generates a haptic signal based on the remaining portion of the input signal. As yet another example, an effect can be a pitch-shift haptic conversion algorithm that shifts a pitch of at least a portion of an input signal, and generates a haptic signal based on the pitch-shifted input signal. As yet another example, an effect can be a frequency-shift haptic conversion algorithm that shifts a frequency of at least a portion of an input signal, and generates a haptic signal based on the frequency-shifted input signal. As yet another example, an effect can be a dynamic window haptic conversion algorithm that is further described below in greater detail in conjunction with FIG. 3.

Example haptic conversion algorithms are described in the following patents or patent applications all of which are hereby incorporated by reference in their entirety: U.S. Pat. Nos. 7,979,146; 8,000,825; 8,378,964; U.S. Pat. App. Pub. No. 2011/0202155; U.S. Pat. App. Pub. No. 2011/0215913; U.S. Pat. App. Pub. No. 2012/0206246; U.S. Pat. App. Pub. No. 2012/0206247; U.S. Pat. App. Pub. No. 2013/0265286; U.S. Pat. App. Pub. No. 2013/0131851; U.S. Pat. App. Pub. No. 2013/0207917; U.S. Pat. App. Pub. No. 2013/0335209; U.S. Pat. App. Pub. No. 2014/0064516; U.S. patent application Ser. No. 13/661,140; U.S. patent application Ser. No. 13/785,166; U.S. patent application Ser. No. 13/788,487; U.S. patent application Ser. No. 14/078,438; U.S. patent application Ser. No. 14/078,442; U.S. patent application Ser. No. 14/078,445; U.S. patent application Ser. No. 14/051,933; U.S. patent application Ser. No. 14/020,461; U.S. patent application Ser. No. 14/020,502; U.S. patent application Ser. No. 14/246,817; and U.S. patent application Ser. No. 14/277,870.

Further, according to an embodiment, a haptic signal can include one or more haptic parameters, where a haptic parameter is a parameter that can define the haptic signal used to generate a haptic effect, and thus, can also define the haptic effect to be generated. More specifically, a haptic parameter is a quantity of a haptic effect quality, such as magnitude, frequency, duration, amplitude, strength, envelope, density, or any other kind of quantifiable haptic parameter. According to the embodiment, a haptic effect can be defined, at least in part, by the one or more haptic parameters of the haptic signal, where the one or more haptic parameters can define characteristics of the haptic effect. A haptic parameter can include a numeric value, where the numeric value can define a characteristic of the haptic signal, and thus, can also define a characteristic of the haptic effect generated by the haptic signal. Examples of haptic parameters can include: an amplitude haptic parameter, a frequency haptic parameter, a duration haptic parameter, an envelope haptic parameter, a density haptic parameter, a magnitude haptic parameter, and a strength haptic parameter.

In accordance with an embodiment, the system can send the haptic signal to a haptic output device, such as an actuator. In turn, the haptic output device can output one or more haptic effects, such as vibrotactile haptic effects, electrostatic friction haptic effects, or deformation haptic effects, in response to the haptic signal sent by the system.

Figure 2:
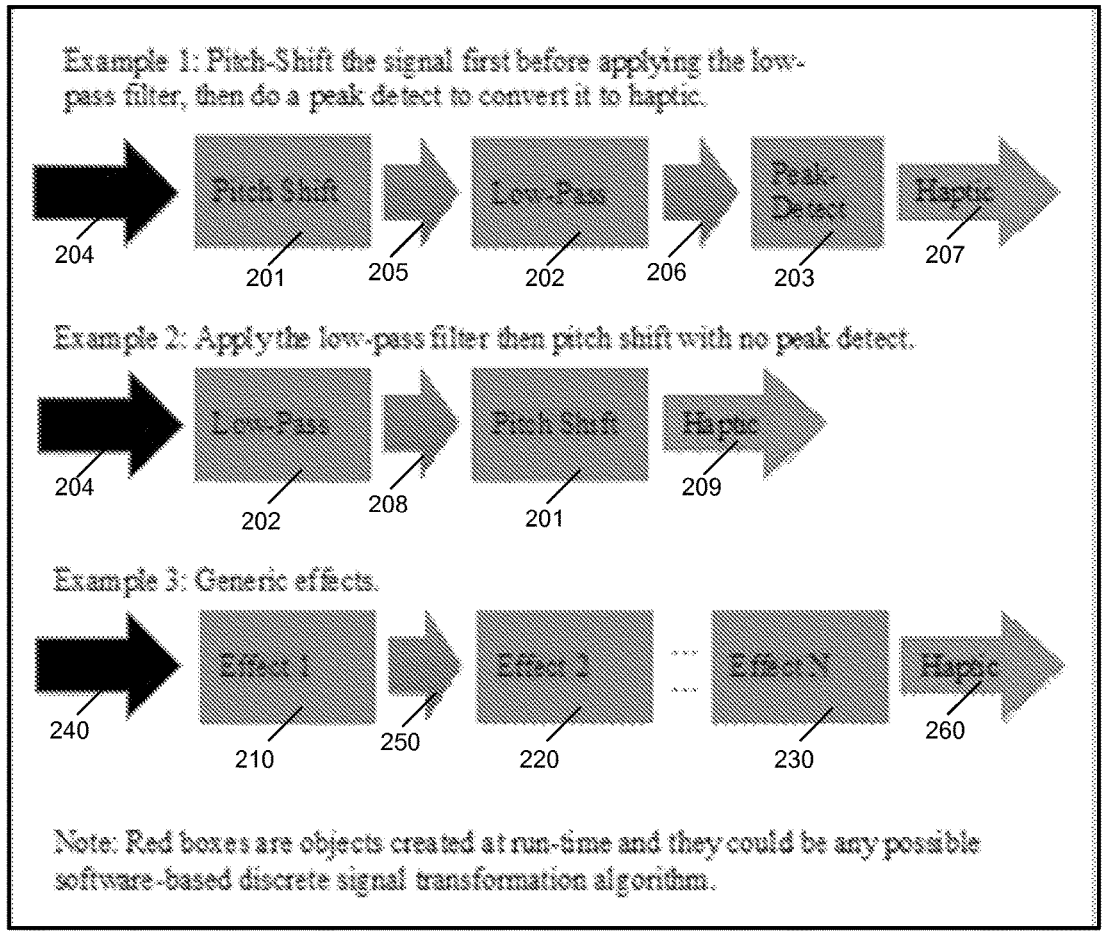
FIG. 2 illustrates examples of dynamically linked effects, according to an embodiment of the invention.

FIG. 2 illustrates examples of dynamically linked effects, according to an embodiment of the invention. A dynamically linked effect can include any number of effect objects, where the effect objects are linked, or chained, according to a pre-defined order. Example 1 illustrates a dynamically linked effect that can be produced by a system (such as system 10 of FIG. 1), where the dynamically linked effect includes a pitch-shift effect object 201, a low-pass filter effect object 202, and a peak-detection effect object 203. Pitch-shift effect object 201 is an effect object that is created at run-time, and that receives an input signal 204, performs a pitch-shift haptic conversion algorithm on input signal 204 to convert input signal 204 into an output signal 205, and outputs the output signal 205 to low-pass filter effect object 202. Low-pass filter effect object 202 is an effect object that is created at run-time, and that receives output signal 205 from pitch-shift effect object 201, performs a low-pass filter haptic conversion algorithm (e.g., a 500 Hz low-pass filter haptic conversion algorithm) on output signal 205 to convert output signal 205 into an output signal 206, and outputs output signal 206 to peak-detection effect object 203. Peak-detection effect object 203 is an effect object that is created at run-time, and that receives output signal 206 from low-pass filter effect object 202, performs a peak-detection haptic conversion algorithm on output signal 206 to convert output signal 206 into an output signal 207 (where output signal 207 is a haptic signal), and outputs output signal 207.

According to an embodiment, if a user of the system is unsatisfied with output signal 207, the user can add one or more effect objects to the dynamically linked effect, remove one or more effect objects from the dynamically linked effect, modify an order of the effect objects of the dynamically linked effect, or a combination therein. The user can accomplish this without re-compiling any objects or modules that contain computer-readable instructions.

For example, example 2 illustrates a dynamically linked effect that is similar to the dynamically linked effect illustrated in example 1, but where peak-detection effect object 203 has been removed, and an order of effects has been modified so that low-pass filter effect object 202 is before pitch-shift effect object 201. According to the embodiment, low-pass filter effect object 202 receives input signal 204, performs a low-pass filter haptic conversion algorithm (e.g., a 500 Hz low-pass filter haptic conversion algorithm) on input signal 204 to convert input signal 204 into an output signal 208, and outputs output signal 208 to pitch-shift effect object 201. Output signal 208 in example 2 is different from output signal 206 in example 1. This is because, in example 1, a pitch-shift haptic conversion algorithm was first applied to input signal 204, and, subsequently, a low-pass filter haptic conversion algorithm was applied to output signal 205. In contrast, in example 2, only a low-pass filter haptic conversion algorithm is applied to input signal 204.

Further, pitch-shift effect object 201 receives output signal 208, performs a pitch-shift haptic conversion algorithm on output signal 208 to convert output signal 208 into output signal 209 (where output signal 209 is a haptic signal), and outputs output signal 209. Output signal 209 in example 2 is different from output signal 207 in example 1. This is because, in example 1, a pitch-shift haptic conversion algorithm was first applied to input signal 204, a low-pass filter haptic conversion algorithm was subsequently applied to output signal 205, and a peak-detection haptic conversion algorithm was subsequently applied to output signal 207. In contrast, in example 2, a low-pass filter haptic conversion algorithm is first applied to input signal 204, and, subsequently, a pitch-shift haptic conversion algorithm is applied to output signal 208.

Thus, any number of effects can be applied by a system at run-time for the purpose of converting an input signal, such as an input audio signal, or input haptic signal, into an output signal, such as a haptic signal. Thus, example 3 illustrates a generic example of a dynamically linked effect that includes N effects, where N can be any number (i.e., effects 210, 220, and 230, where the ellipses between effects 220 and 230 can represent any number of effects). Thus, in example 3, effect 210 receives input signal 240, performs a haptic conversion algorithm on input signal 240 to convert input signal 240 to output signal 250, and outputs output signal 250 to effect 220. This is performed N times using N effects until effect 230 (i.e., the Nth effect) outputs output signal 260, where output signal 260 is a haptic signal.

In one embodiment, if the system determines a haptic conversion algorithm is too large or too complex to execute during playback of an input signal, the system can provide a rendering option. More specifically, the system can perform the haptic conversion algorithm offline (i.e., before, or independent of, a playback of the input signal).

As previously described, a dynamically linked effect includes an input signal, a plurality of effects, and an output signal that is generated by the plurality of effects. In one embodiment, the input signal can include metadata in additional to the actual signal itself. The metadata can be used by the system to determine which effects to use, to determine an order of the effects, or a combination therein. According to the embodiment, the signal itself can move through the effects serially, and a haptic output device, such as an actuator, can use the output signal, which is a haptic signal, to generate one or more haptic effects.

Further, in one embodiment, as previously described, a system can perform a conversion of an input signal, such as an audio signal, to a haptic signal by dynamically creating and updating a range (i.e., window) that defines a portion of the input signal based on a minimum and maximum magnitude value of the input signal, and by scaling the portion of the input signal that falls within the window. Portions of the input signal that do not fall within the window are not scaled by the system. Further, the system can frequently update the minimum and maximum magnitude value, and can further update the window based on the updated minimum and maximum magnitude values. Thus, the window can be a dynamic window. Such a haptic conversion algorithm is identified as a dynamic window haptic conversion algorithm.

One of the problems with previous haptic conversion systems is that a magnitude of an input signal (e.g., an input audio signal) may not be high enough to provide a "feelable" haptic effect, even after haptic conversion has been performed. In other words, in the example of an input audio signal, if the input audio signal is not loud enough, the haptic effects that are output based on a converted haptic signal may not provide an appropriate haptic experience from a user perspective. According to an embodiment, by dynamically creating and updating a window that defines a portion of the input signal that is to be scaled, and subsequently scaling the portion of the input signal that falls within the window, the portion of the input signal can be mapped to a specific haptic "window of feelability." This way, in the example of an input audio signal, if the audio is softer than what is necessary from a haptic perspective, the input audio signal can still be converted to an appropriate haptic signal within an appropriate haptic window.

Further, according to the embodiment, the window can be dynamic (i.e., can frequently or infrequently move) depending on a global minimum magnitude value and a global maximum magnitude value, which can frequently (or infrequently) be updated. Based on the global minimum and maximum magnitude values, one or more threshold values can be determined. The one or more threshold values can be used to determine whether a portion of an input signal falls within the window, and thus, whether the portion of the input signal is scaled. This can be done for each portion of the input signal, so that the entire input signal can be converted into a haptic signal. According to the embodiment, some portions of the input signal may be scaled, and other portions of the input signal may not be scaled. In one embodiment, one or more magnitude values of a portion of an input signal can be analyzed to determine a "bin" that the portion of the input signal belongs to, and the portion of the input signal can be mapped to the bin. In alternate embodiments, rather than bins, other methods, such as mathematical formulas or look-up tables, can be used to interpret the minimum and maximum magnitude values, determine one or more threshold values, and determine whether a portion of the input signal falls within the window.

According to an embodiment, in order to implement the dynamic window haptic conversion algorithm, dynamic range compression can be executed. Dynamic range compression is the compression of magnitude values of an input signal, such as an audio signal, within a specified range. For example, with an input audio signal, loud sounds can be reduced to a certain range to prevent clipping, and soft sounds can be amplified to fall within the same range such that they are heard. Dynamic range compression can be ultimately controlled by a threshold of a dynamic compression algorithm, where the threshold can be represented by one or more threshold values. Further, there can be two kinds of dynamic range compression: downward compression; and upward compression. In downward compression, the magnitude values of signals that are over the threshold are reduced, while the magnitude values of signals that are at or below the threshold are unchanged. In upwards compression, the magnitude values of signals that are below the threshold are increased, while the magnitude values of signals that are at or above the threshold are unchanged. According to an embodiment, the dynamic window haptic conversion algorithm can use a global minimum magnitude value and a global maximum magnitude value for each portion of an input signal to determine a threshold used by the dynamic compression algorithm for each portion of the input signal. The dynamic window haptic conversion algorithm is further described below in greater detail in conjunction with FIG. 3.

Figure 3:
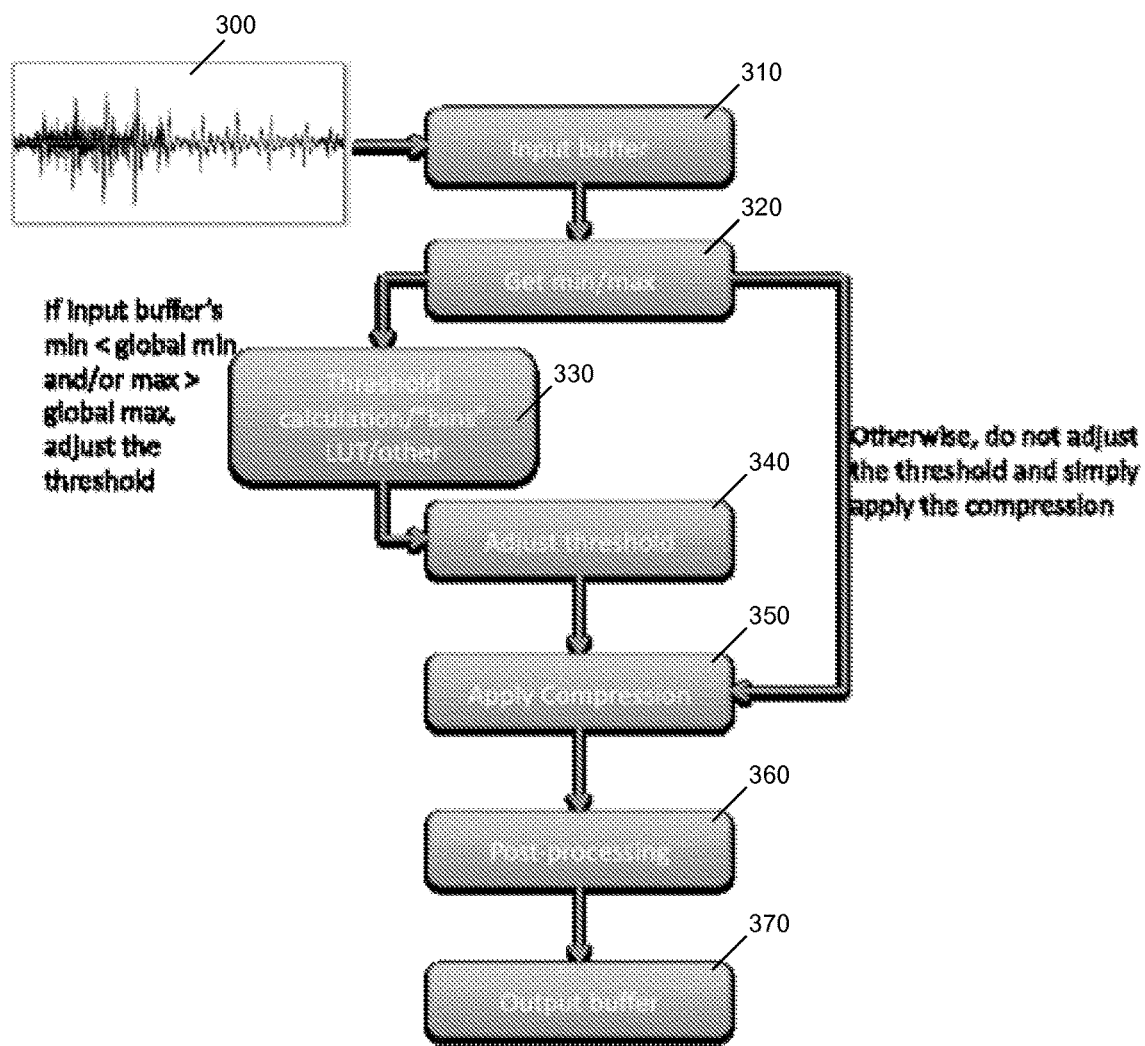
FIG. 3 illustrates a flow diagram of the functionality of a dynamic window haptic conversion algorithm, according to an embodiment of the invention.

FIG. 3 illustrates a flow diagram of the functionality of a dynamic window haptic conversion algorithm, according to an embodiment of the invention. In one embodiment, the functionality of FIG. 3, as well as the functionality of FIGS. 12, 13, and 14 described below, are implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 310, where at least a portion of input signal 300 is received as an input buffer. In some embodiments, only a portion of input signal 300 is received as the input buffer. In other embodiments, input signal 300 in its entirety is received as the input buffer. Optionally, any necessary pre-processing of the input buffer is performed. The flow then proceeds to 320.

At 320, a minimum magnitude value and a maximum magnitude value of the input buffer are retrieved by analyzing input signal 300, or a portion of input signal 300, that is contained within the input buffer, and determining a minimum magnitude value and a maximum magnitude value of input signal 300, or the portion of input signal 300. The retrieved minimum magnitude value is then compared with a global minimum magnitude value, and the retrieved maximum magnitude value is further compared with a global maximum magnitude value. If the retrieved minimum magnitude value is less than the global minimum magnitude value, the retrieved maximum magnitude value is greater than the global maximum magnitude value, or a combination therein, the flow proceeds to 330. Otherwise, the flow proceeds to 350. Further, if there are no global minimum and maximum magnitude values, the global minimum and maximum magnitude values are set to the retrieved minimum and maximum magnitude values, and the flow proceeds to 350.

At 330, if the retrieved minimum magnitude value is less than the global minimum magnitude value, the global minimum magnitude value is adjusted to be equal to the retrieved minimum magnitude value. Further, if the retrieved maximum magnitude value is greater than the global maximum magnitude value, the global maximum magnitude value is adjusted to be equal to the retrieved maximum magnitude value. Subsequently, the global minimum and maximum magnitude values are interpreted and one or more threshold magnitude values are determined based on the interpreted global minimum and maximum magnitude values. The one or more threshold magnitude values can be determined according to one of many different processes. For example, in one embodiment, based on the interpreted global minimum and maximum magnitude values, the input buffer can be mapped to a bin, where one or more threshold magnitude values are pre-defined for the bin. The one or more pre-defined threshold magnitude values that are associated with the mapped bin can be used as the one or more threshold magnitude values. In another embodiment, one or more threshold magnitude values can be calculated based on the interpreted global minimum and maximum magnitude values using one or more mathematical formulas. In this embodiment, the one or more mathematical formulas can be applied to the interpreted global minimum and maximum magnitude values in order to calculate the one or more threshold magnitude values. In another embodiment, one or more look-up tables can be analyzed using the interpreted global minimum and maximum magnitude values, and one or more threshold magnitude values can be selected from the one or more look-up tables based on the interpreted global minimum and maximum magnitude values. In alternate embodiments, the one or more threshold magnitude values can be determined based on the interpreted global minimum and maximum magnitude values using any process that is known to one of ordinary skill in the relevant art. The flow proceeds to 340.

At 340, one or more threshold magnitude values of a dynamic range compression algorithm can be adjusted to equal the one or more threshold magnitude values determined at 330. The flow then proceeds to 350.

At 350, a dynamic range compression algorithm is applied to input signal 300, or a portion of input signal 300, contained within the input buffer. In one embodiment, an upward compression algorithm is applied. In this embodiment, any magnitude values of input signal 300, or the portion of input signal 300, that are below the one or more threshold magnitude values are upwardly scaled (i.e., increased). All other magnitude values of input signal 300, or the portion of input signal 300, are unchanged. The flow then proceeds to 360.

At 360, optionally, any necessary post-processing of the input buffer is performed. The flow then proceeds to 370.

At 370, the input buffer is output. More specifically, input signal 300, or a portion of input signal 300, contained within the input buffer is output. If only a portion of input signal 300 is contained within the input buffer, the flow illustrated in FIG. 3 can be repeated for each portion of input signal 300. The flow then ends.

Thus, according to the embodiment, the dynamic window haptic conversion algorithm can modify an input signal by increasing magnitude values of portions of the input signal that are below a threshold, and by leaving intact other portions of the input signal whose magnitude values are at or above a threshold. As a result, the dynamic window haptic conversion algorithm can convert the input signal into a haptic signal that can be used to generate one or more haptic effects that can actually be felt by a user, even in the event of a weak input signal, due to an upward scaling of the input signal, or portions of the input signal. Further, the dynamic window haptic conversion algorithm can modify an input signal so that input signal can be converted to a haptic signal that can be used to generate a haptic effect that can be felt, no matter the type of haptic output device used to generate the haptic effect. Further, as previously described, the dynamic window haptic conversion algorithm can be a haptic conversion algorithm that is dynamically linked, or chained, with other haptic conversion algorithms.

Further, in one embodiment, as previously described, a system can dynamically compress a haptic signal, or haptic stream, and stream the dynamically compressed haptic signal to a haptic output device. By dynamically compressing the haptic signal, the system can select a compression algorithm to apply to the haptic signal based on a round trip duration between the system and a client, one or more characteristics of the haptic signal, or a combination therein. By compressing the haptic signal, the system can cause the haptic signal to take up less space within a medium.

Thus, in accordance with an embodiment, a system can provide multiple ways to efficiently compress a haptic signal, such as an 8,000 Hz 8-bit pulse-code modulation ("PCM") signal, for a wide variety of actuator types. Further, as part of the compression, the system can eliminate one or more frequencies that are not necessary to store the haptic signal. Further, the haptic signal can also include n channels, where n is any number. In this case, the data contained within the n channels can be interleaved with the haptic signal.

As one example, a piezoelectric actuator can perform best when it plays a haptic signal (or haptic stream) that contains frequency ranges from 50 Hz to 300 Hz. This can mean that other frequency ranges in the haptic signal may not be needed, and it may not be desired to play the other frequency ranges of the haptic signal at the piezoelectric actuator. The system can eliminate these frequency ranges and efficiently store compressed haptic data by utilizing a haptic encoding algorithm with specific filter banks. These filters banks can filter out any undesired frequency ranges and can store only desired frequency ranges. The system can further quantize the resulting haptic data. A quantization algorithm could be lossy or lossless. The system can then utilize a haptic coding algorithm, such as a Huffman coding algorithm, to compress the haptic data even further. On the decoding side, the system can reverse the aforementioned process and retrieve the haptic data that includes the desired frequency ranges. The haptic data can be sent directly to the piezoelectric actuator, where the haptic data can be played to generate a haptic effect.

As another example, performances of an ERM actuator and an LRA actuator can vary depending on type and drive circuit, so it cannot be assumed that certain frequency ranges would be desirable for these types of actuators. For this example, the system can utilize a different haptic encoding algorithm that averages the haptic data at a 1 ms interval, which converts the haptic data to 1000 Hz, 8-bit, which is eight times smaller than the original. The system can further use lossless quantizers and one or more haptic coding algorithms to shrink the haptic data down even more. The system can subsequently utilize a decoding algorithm that reverses the haptic coding and quantizer processes, and plays the haptic data back using an effect call on a 1000 Hz, 8-bit data stream with an update rate of 1 ms.

In another example, raw haptic data of a haptic signal, or haptic stream, can be received. Ideally, this haptic data has already been through a design-time conversion in which a haptic conversion algorithm has been performed on the signal. A haptic output device, such as a piezoelectric actuator, may only provide a desirable haptic effect at a specific frequency range (e.g., 150-350 Hz). According to an embodiment, the system can represent haptic data in a frequency range of 150-350 Hz with a doubled sampling rate (e.g., a sampling rate of 800 Hz) using a haptic signal, or haptic stream.

In order to scale a haptic signal from 44.1/48 KHz PCM down to 800 Hz PCM, the system can use a filter bank that removes all high frequency components (e.g., frequency components greater than or equal to 400 Hz) of the haptic signal, so that the haptic signal only includes content less than 400 Hz. The system can then resample the signal down to 800 Hz. This process can result in a haptic signal with a sampling rate of 800 Hz. The filter bank can also remove all low frequency components (e.g., frequency components less than 50 Hz).

In this example, if the haptic coding algorithm is a lossy coding algorithm, the system can quantize the haptic signal and use a Huffman coding algorithm to compress the haptic data even further. However, if the haptic signal is to be loselessly compressed, the haptic signal can use a linear predictive coding algorithm to approximate components of the haptic signal and compress the errors.

Further, for a haptic signal for a LRA actuator, or an ERM actuator, the haptic data can be a series of magnitude values sampled at 200 Hz. The system can apply a lossless coding algorithm to compress the haptic data down.

An example of a dynamic compression of a haptic signal is further described below in greater detail in conjunction with FIGS. 4-11.

Figure 4:
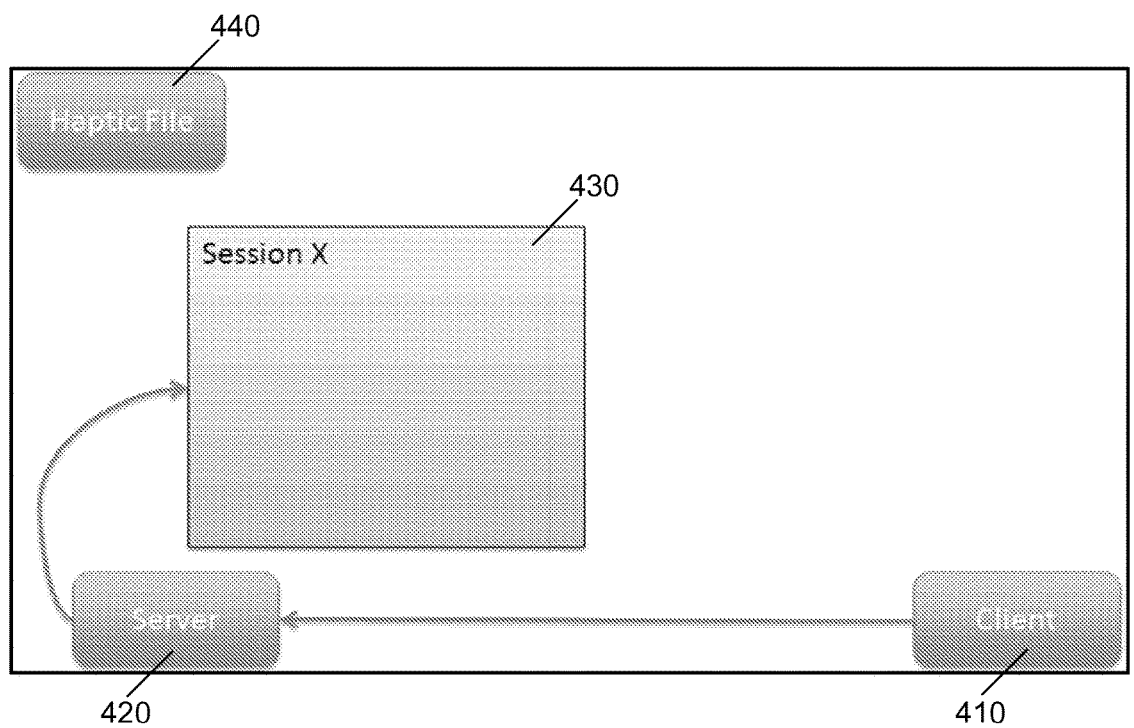
FIG. 4 illustrates a request to stream a haptic signal that is a component of a dynamic compression of a haptic signal, according to an embodiment of the invention.

FIG. 4 illustrates a request to stream a haptic signal that is a component of a dynamic compression of a haptic signal, according to an embodiment of the invention. More specifically, FIG. 4 illustrates a client 410 and a server 420. According to the embodiment, client 410 sends a request to server 420, where the request is a request to initiate a session 430 (i.e., "Session X") to stream a haptic file 440, where haptic file 440 includes a haptic signal, or haptic stream. In response, server 420 initiates session 430.

Figure 5:
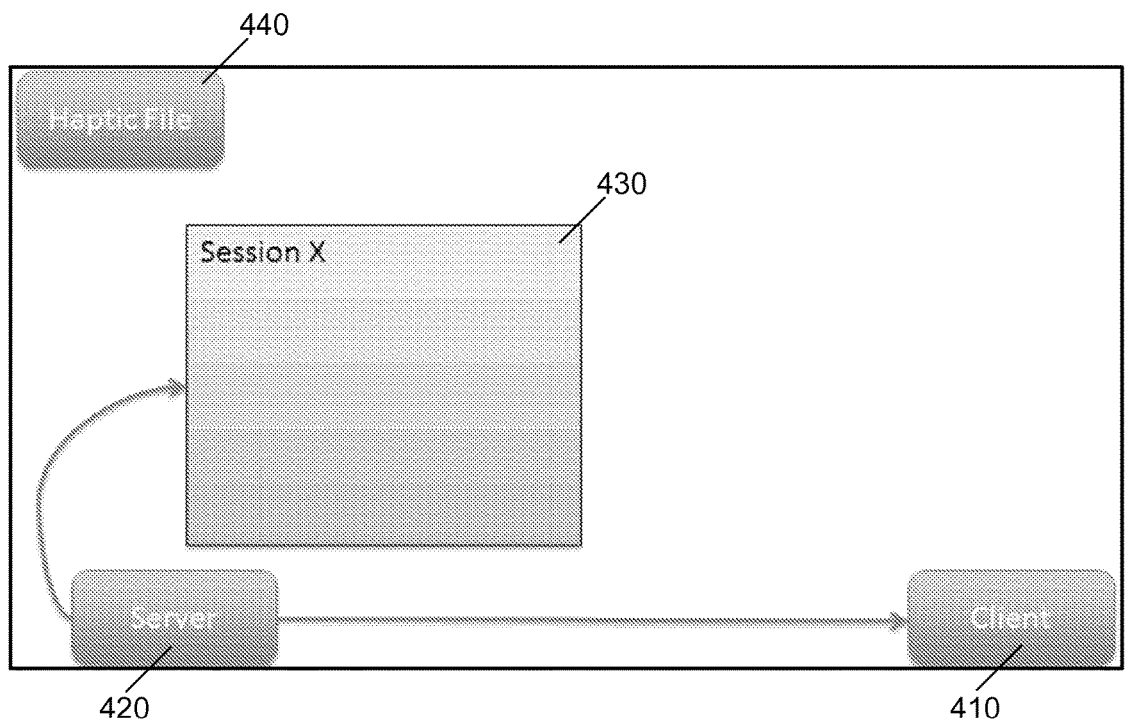
FIG. 5 illustrates an initialization of a streaming session that is a component of a dynamic compression of a haptic signal, according to an embodiment of the invention.

FIG. 5 illustrates an initialization of a streaming session that is a component of a dynamic compression of a haptic signal, according to an embodiment of the invention. According to the embodiment, server 420 sends a confirmation to client 410, confirming that session 430 has been initiated. Further, server 420 measures a round-trip duration between client 410 and server 420. More specifically, server 420 measures an amount of time it takes to send data to, and receive data from, client 410.

Figure 6:
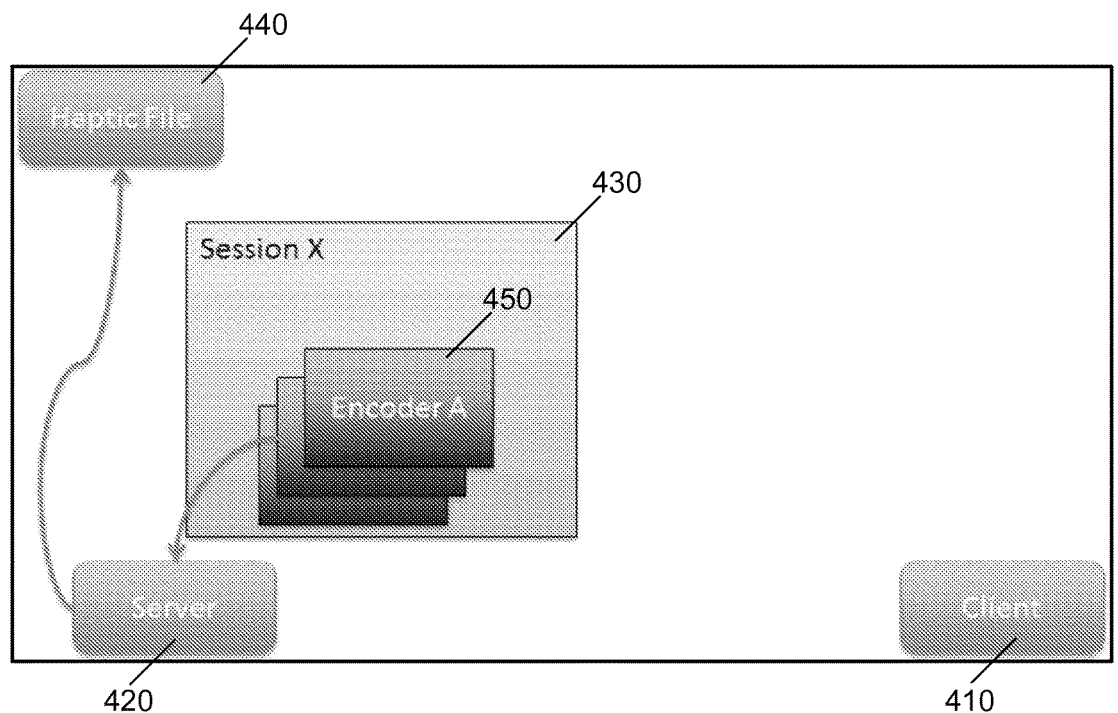
FIG. 6 illustrates a determination of a compression algorithm that is a component of a dynamic compression of a haptic signal, according to an embodiment of the invention.

FIG. 6 illustrates a determination of a compression algorithm that is a component of a dynamic compression of a haptic signal, according to an embodiment of the invention. According to the embodiment, server 420 selects a compression algorithm to apply to haptic file 440 based on: the measured round-trip duration between client 410 and server 420; one or more characteristics of the haptic signal, or haptic stream, stored within haptic file 440; or a combination therein. Server 420 can optionally select a haptic encoding algorithm 450 (i.e., "Encoder A") in addition to a compression algorithm. Example characteristics of a haptic signal can include a magnitude, frequency, duration, amplitude, strength, envelope, density, or any other kind of quantifiable physical characteristic of the haptic signal.

Figure 7:
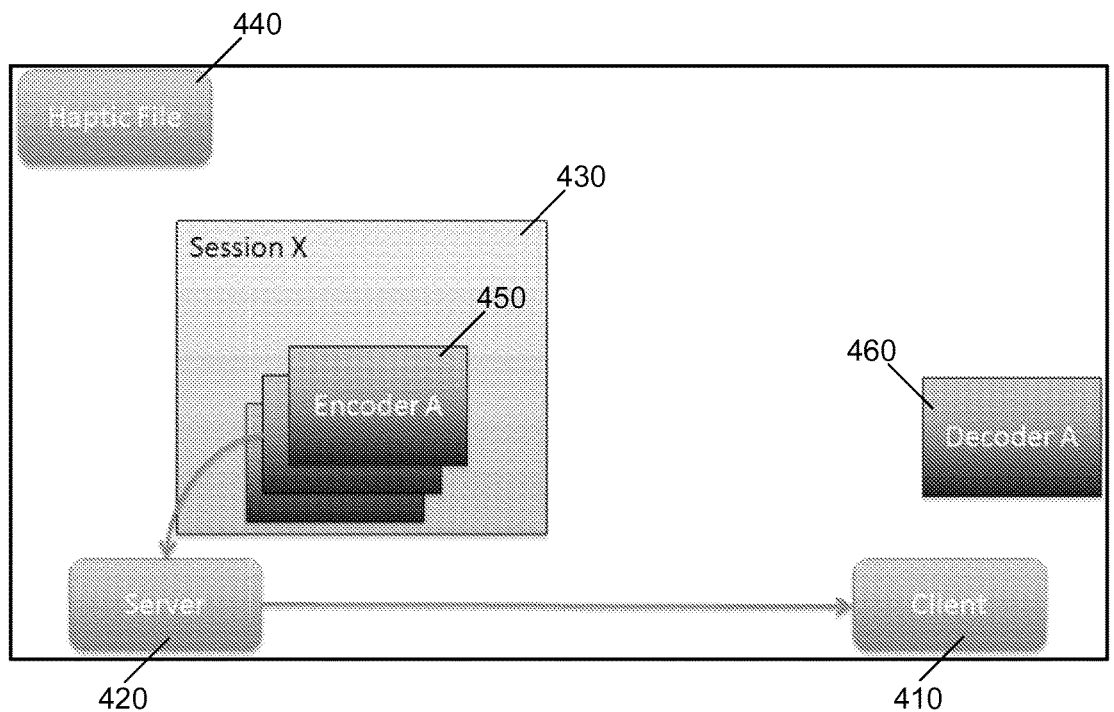
FIG. 7 illustrates a communication of the compression algorithm that is a component of a dynamic compression of a haptic signal, according to an embodiment of the invention.

FIG. 7 illustrates a communication of the compression algorithm that is a component of a dynamic compression of a haptic signal, according to an embodiment of the invention. According to the embodiment, server 420 sends an indication of a selection of the compression algorithm (and optionally the selection of haptic encoding algorithm 450) to client 410. In accordance with the embodiment, a decompression algorithm may be available to client 410. Optionally, a haptic decoding algorithm 460 (i.e., "Decoder A") may also be available to client 410.

Figure 8:
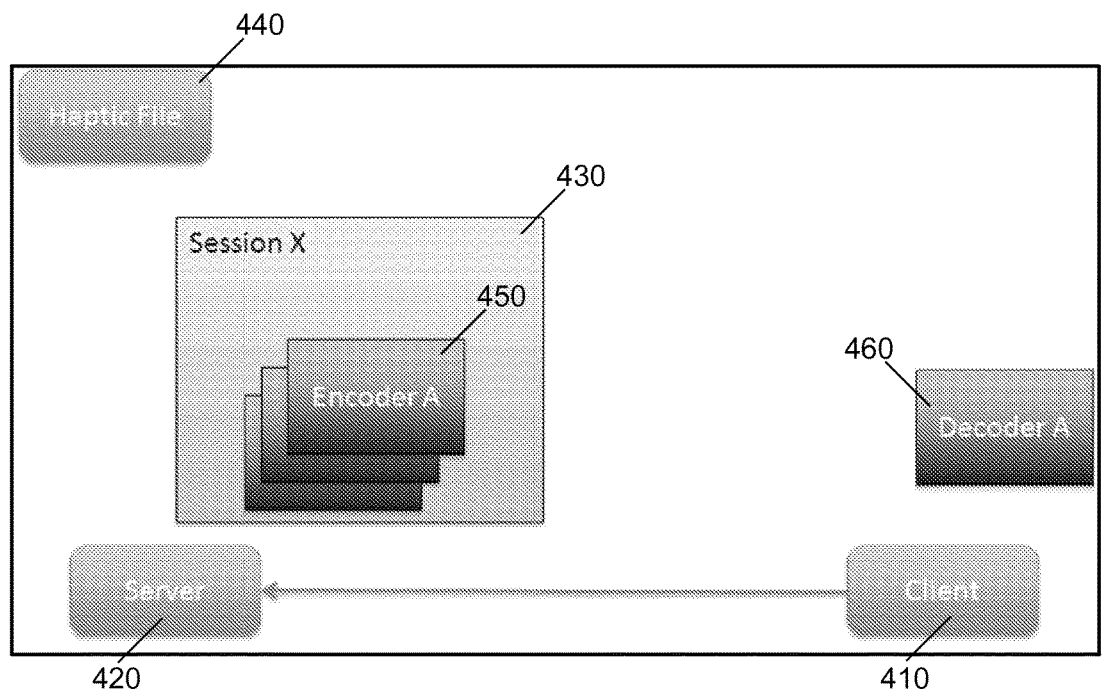
FIG. 8 illustrates a reply communication that is a component of a dynamic compression of a haptic signal, according to an embodiment of the invention.

FIG. 8 illustrates a reply communication that is a component of a dynamic compression of a haptic signal, according to an embodiment of the invention. According to the embodiment, client 410 sends a reply to server 420. The reply can indicate that server 420 can start to stream haptic file 440. The reply can alternatively request that server 420 terminate session 430. Client 410 may wish to terminate session 430 because a decompression algorithm that matches the compression algorithm indicated by server 420 is not available to client 410. Client 410 may also wish to terminate session 430 because a haptic decoding algorithm that matches haptic encoding algorithm 450 is not available to client 410. The reply can alternatively request that server 420 use a compression algorithm that matches a decompression algorithm available to client 410. The reply can additionally, or alternatively, request that server 420 use a haptic coding algorithm that matches a haptic decoding algorithm that is available to client 410 (e.g., haptic decoding algorithm 460).

Figure 9:
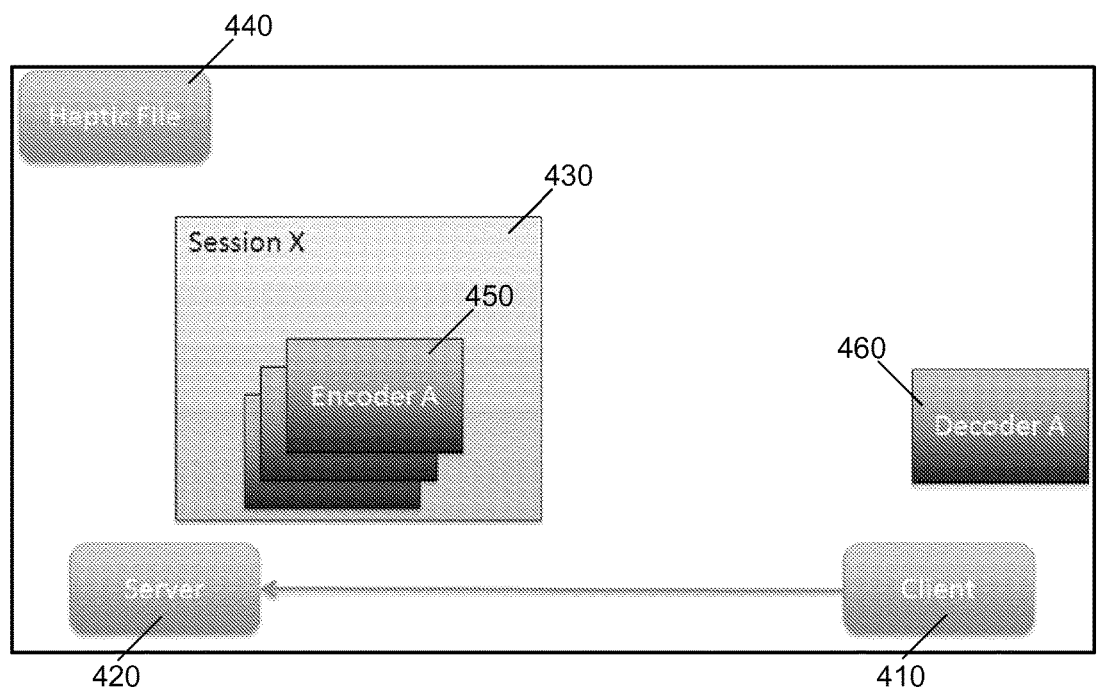
FIG. 9 illustrates a reply communication that is a component of a dynamic compression of a haptic signal, according to an embodiment of the invention.

FIG. 9 illustrates a reply communication that is a component of a dynamic compression of a haptic signal, according to an embodiment of the invention. According to the embodiment, client 410 sends a reply to server 420. As previously described, the reply can request that server 420 use a compression algorithm that matches a decompression algorithm available to client 410. The reply can additionally, or alternatively, request that server 420 use a haptic coding algorithm that matches a haptic decoding algorithm that is available to client 410 (e.g., haptic decoding algorithm 460). In this embodiment, the reply can also include: a list of one or more decompression algorithms that are available to client 410; a list of one or more haptic decoding algorithms (e.g., haptic decoding algorithm 460) that are available to client 410; or a combination therein.

Figure 10:
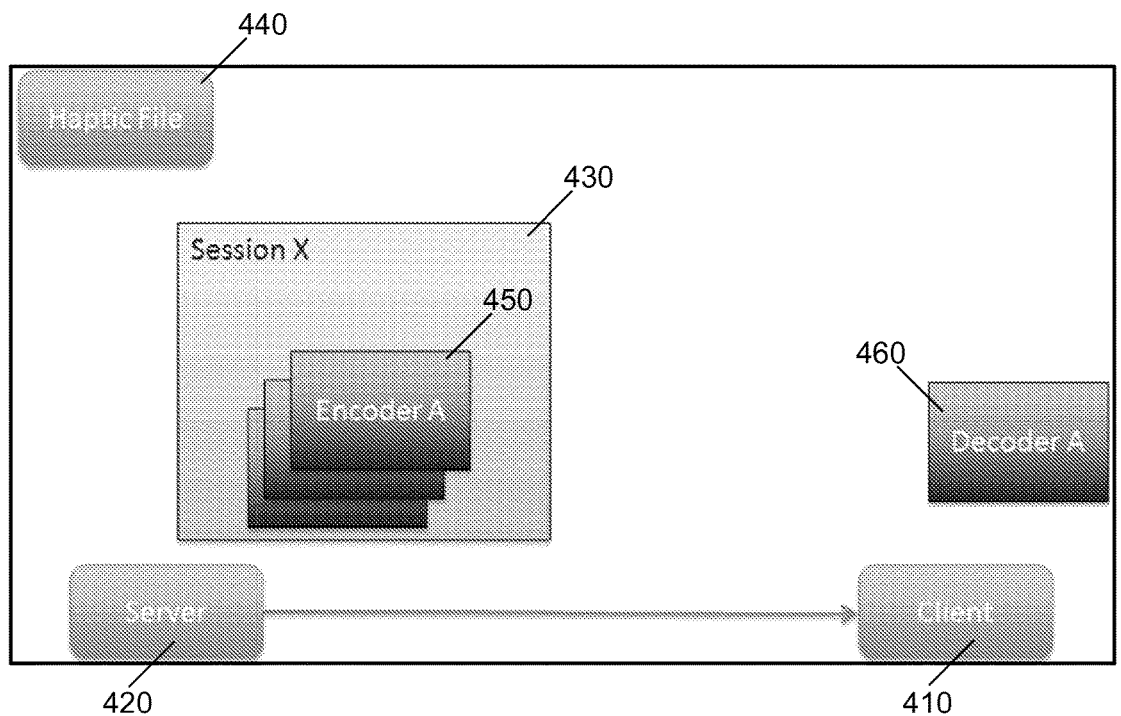
FIG. 10 illustrates a compression communication that is a component of a dynamic compression of a haptic signal, according to an embodiment of the invention.

FIG. 10 illustrates a compression communication that is a component of a dynamic compression of a haptic signal, according to an embodiment of the invention. According to the embodiment, server 420 sends an indication to client 410, where the indication indicates to client 410 that server 420 will start sending data to client 410, and where the indication further instructs client 410 to start receiving the data that server 420 sends to client 410.

Figure 11:
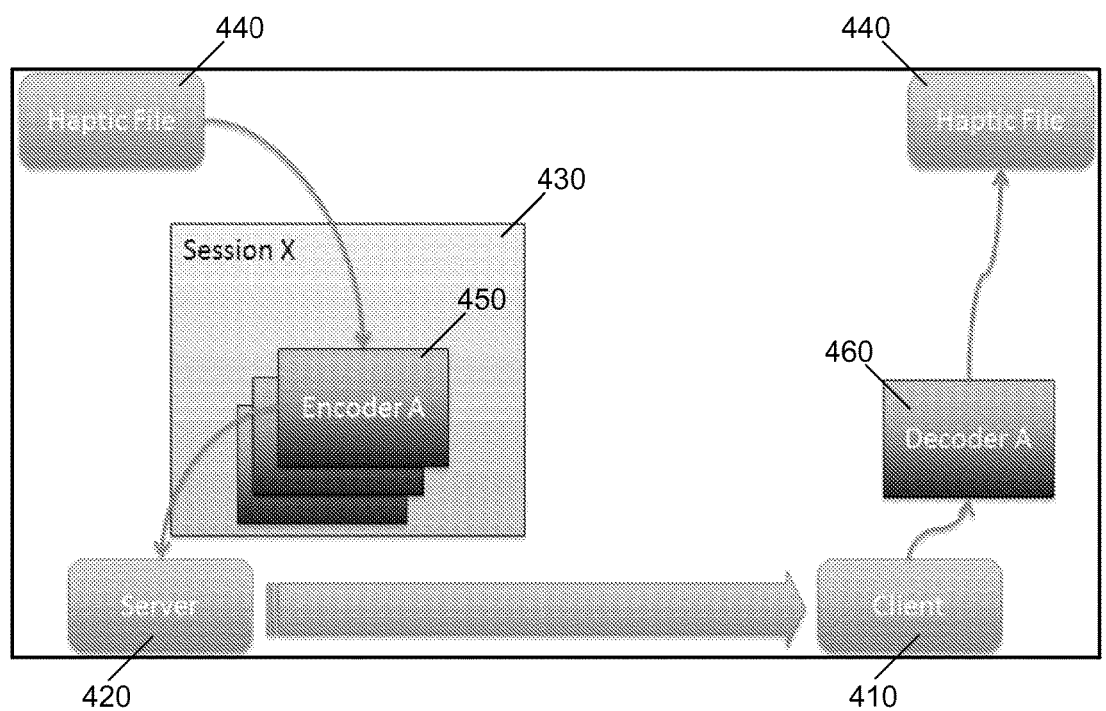
FIG. 11 illustrates a compression and streaming of a haptic signal that is a component of a dynamic compression of the haptic signal, according to an embodiment of the invention.

FIG. 11 illustrates a compression and streaming of a haptic signal that is a component of a dynamic compression of the haptic signal, according to an embodiment of the invention. According to the embodiment, server 420 applies a compression algorithm to haptic file 440, and compresses haptic file 440. Further, server 420 optionally applies haptic encoding algorithm 450 and encodes haptic file 440. Server 420 subsequently streams haptic file 440 to client 410. Client 410 applies a decompression algorithm to haptic file 440, and decompresses haptic file 440. Further, server 420 optionally applies haptic decoding algorithm 460 and decodes haptic file 440.

Figure 12:
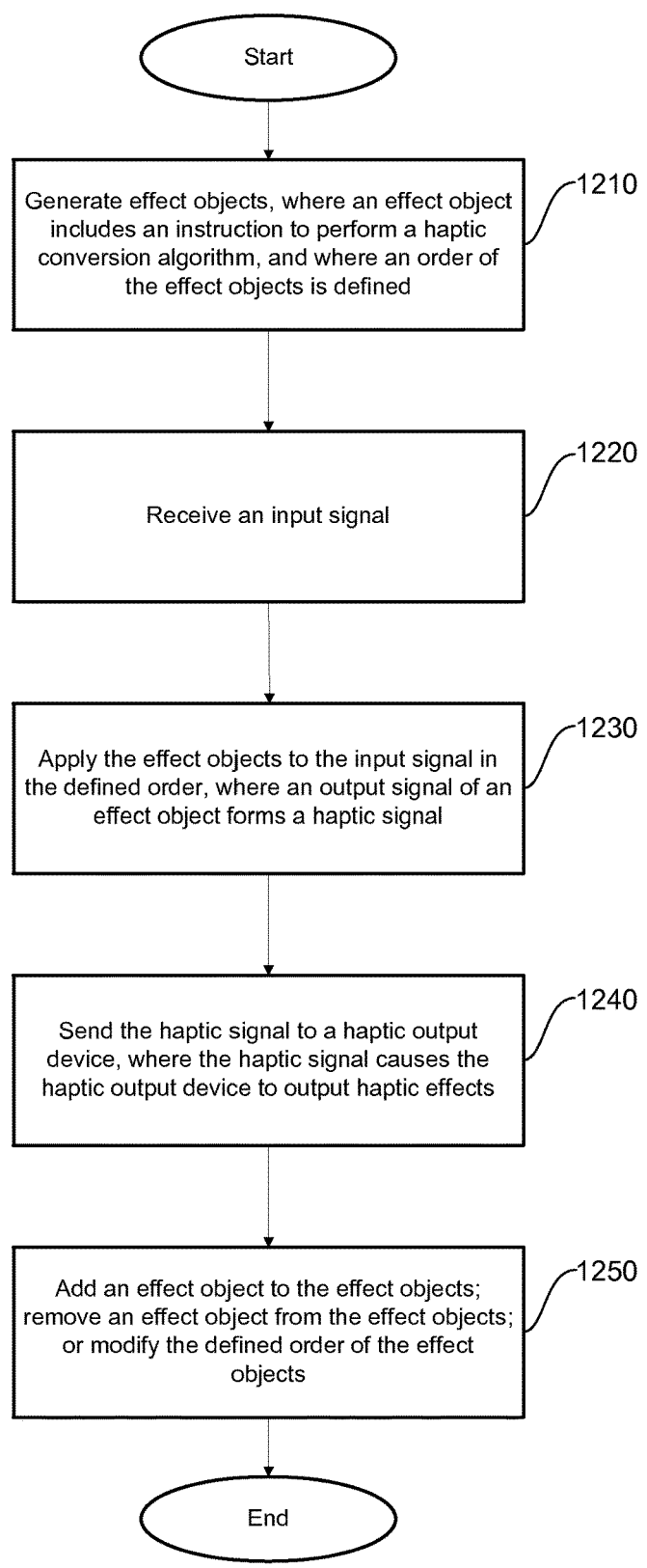
FIG. 12 illustrates a flow diagram of the functionality of a dynamic haptic conversion module, according to an embodiment of the invention.

FIG. 12 illustrates a flow diagram of the functionality of a dynamic haptic conversion module, according to an embodiment of the invention. The flow begins and proceeds to 1210. At 1210, effect objects are generated, where an effect object includes an instruction to perform a haptic conversion algorithm on an input signal to convert the input signal into an output signal, and where an order of the effect objects is defined. In certain embodiments, the haptic conversion algorithm of at least one effect object can be a dynamic window haptic conversion algorithm as previously described, and as is further described below in conjunction with FIG. 13. The flow then proceeds to 1220.

At 1220, an input signal is received. In certain embodiments, the input signal can be an audio signal, or other type of audio input, that includes audio data. In alternate embodiments, the input signal can be a video signal, or other type of video input, that includes video data. In other alternate embodiments, the input signal can be an acceleration signal, or other type of acceleration input, that includes acceleration data. In other alternate embodiments, the input signal can be a haptic signal, or other type of haptic input, that includes haptic data. In yet other alternate embodiments, the input signal can be an orientation signal that includes orientation data, an ambient light signal that includes ambient light data, or another type of signal that can be sensed by a sensor. Further, in other alternate embodiments, the input is not an input signal, but can be another type of input that contains data. In some embodiments, the input signal can include metadata that defines the effect objects and the order of the effect objects. The flow then proceeds to 1230.

At 1230, the effect objects are applied to the input signal in the defined order, where an output signal of a predecessor effect object is an input signal of a successor effect object, and where the output signal of the last effect object forms a haptic signal. The flow then proceeds to 1240.

At 1240, the haptic signal is sent to a haptic output device, where the haptic signal causes the haptic output device to output haptic effects. In certain embodiments, the haptic output device can be an actuator. The flow then proceeds to 1250.

At 1250, an effect object can be added to the effect objects; an effect object can be removed from the effect objects; the defined order of the effect objects can be modified; or a combination therein. Further, in some embodiments, multiple effect objects can be added; multiple effect objects can be removed; or a combination therein. Even further, 1220, 1230, and 1240 can be re-performed to generate a new haptic signal that is different from the original haptic signal, and the new haptic signal can be sent to the haptic output device. Thus, at 1250, a user can modify the overall haptic conversion algorithm that is produced from the effect objects by modifying the effect objects, modifying the order of the effect objects, or a combination therein. Thus, the haptic conversion algorithm is a dynamic haptic conversion algorithm. In some embodiments, 1250 can be omitted. Further, in some embodiments, after 1230, and before 1240, a dynamic compression algorithm can be performed on the haptic signal as previously described, and as is further described below in conjunction with FIG. 14. The flow then ends.

Figure 13:
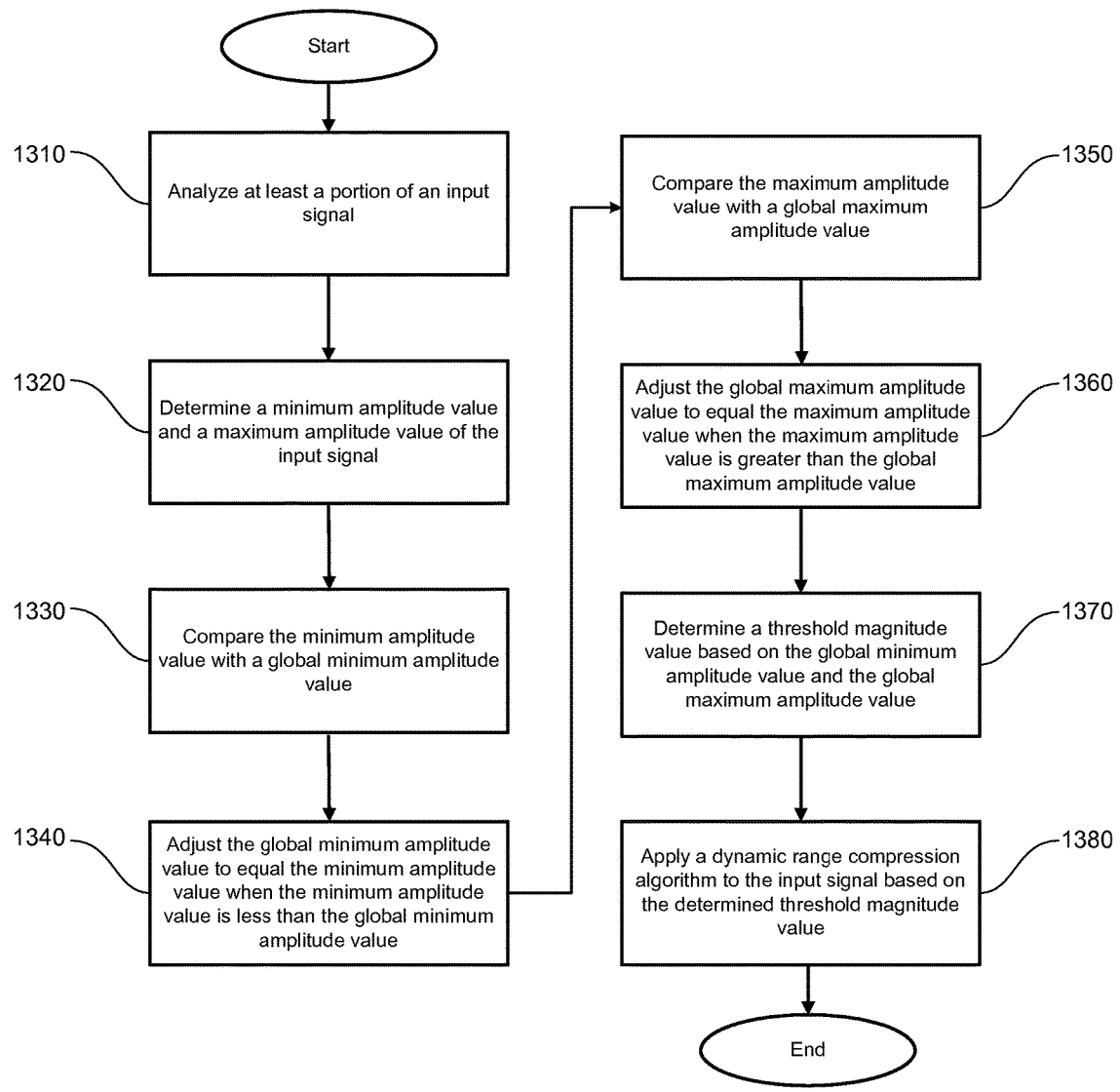
FIG. 13 illustrates a flow diagram of the functionality of a dynamic haptic conversion module, according to an embodiment of the invention.

FIG. 13 illustrates a flow diagram of the functionality of a dynamic haptic conversion module, according to an embodiment of the invention. The flow begins and proceeds to 1310. At 1310, a portion of an input signal is analyzed. In certain embodiments, the entire input signal is analyzed. The flow then proceeds to 1320. At 1320, a minimum amplitude value and a maximum amplitude value of the input signal (or the portion of the input signal) are determined. The flow then proceeds to 1330.

At 1330, the minimum amplitude value is compared with a global minimum amplitude value. The flow then proceeds to 1340. At 1340, the global minimum amplitude value is adjusted to equal the minimum amplitude value when the minimum amplitude value is less than the global minimum amplitude value. In embodiments where there is not a global minimum amplitude value, a global minimum amplitude value is created and set equal to the minimum amplitude value. The flow then proceeds to 1350.

At 1350, the maximum amplitude value is compared with a global maximum amplitude value. The flow then proceeds to 1360. At 1360, the global maximum amplitude value is adjusted to equal the maximum amplitude value when the maximum amplitude value is greater than the global maximum amplitude value. In embodiments where there is not a global maximum amplitude value, a global maximum amplitude value is created and set equal to the maximum amplitude value. The flow then proceeds to 1370.

At 1370, a threshold magnitude value is determined based on the global minimum amplitude value and the global maximum amplitude value. In certain embodiments, the threshold magnitude value can be determined by mapping the input signal (or the portion of the input signal) to a bin based on the global minimum amplitude value and the global maximum amplitude value, where the threshold magnitude value is pre-defined for the bin. In other embodiments, the threshold magnitude value can be determined by selecting the threshold magnitude value from a look-up table based on the global minimum amplitude value and the global maximum amplitude value. In yet other embodiments, the threshold magnitude value can be determined by applying a mathematical formula to the global minimum amplitude value and the global maximum amplitude value to calculate the threshold magnitude value. The flow then proceeds to 1380.

At 1380, a dynamic range compression algorithm is applied to the input signal, or the portion of the input signal, based on the determined threshold magnitude value. In certain embodiments, by applying the dynamic range compression algorithm, one or more magnitude values of the input signal, or the portion of the input signal, that are below the determined threshold magnitude value are upwardly scaled. In certain embodiments, 1310-1380 can be performed for each portion of the input signal. The flow then ends.

Figure 14:
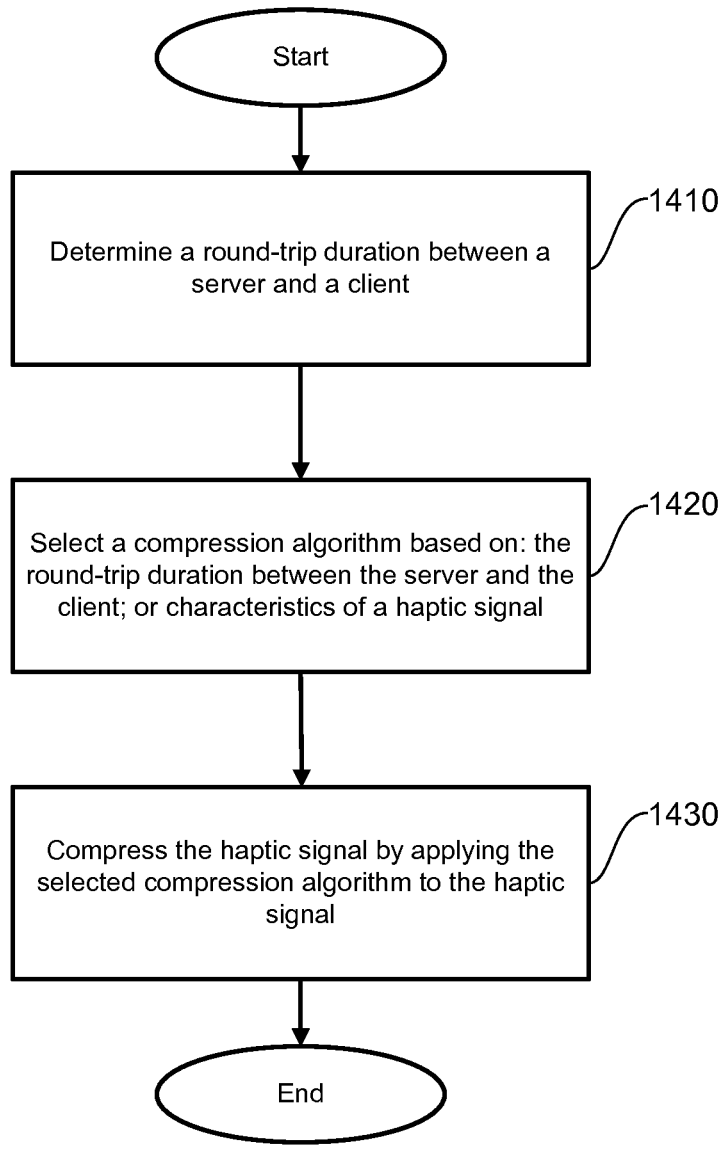
FIG. 14 illustrates a flow diagram of the functionality of a dynamic haptic conversion module, according to an embodiment of the invention.

FIG. 14 illustrates a flow diagram of the functionality of a dynamic haptic conversion module, according to an embodiment of the invention. The flow begins and proceeds to 1410. At 1410, a round-trip duration between a server and a client is determined. The flow then proceeds to 1420. At 1420, a compression algorithm is selected based on: the round-trip duration between the server and the client; one or more characteristics of a haptic signal; or a combination therein. The flow then proceeds to 1430. At 1430, the haptic signal is compressed by applying the selected compression algorithm to the haptic signal. The flow then ends.

Thus, in one embodiment, a system can perform conversion of an input signal to a haptic signal by dynamically linking, or chaining, various haptic conversion algorithms (i.e., effects). This can enable end users to fully customize their haptic effects using parameters they are more familiar with. End users can use a test application that can access the effects in order to determine what haptic conversion algorithms "feel" best on their devices. Further, end users can have a faster turnaround in determine haptic conversion algorithms that work well on their devices. If an end user finds a new effect that can be used as part of a specific haptic conversion algorithm, the effect can be placed in a bank of effects that can dynamically be linked, or chained, together for use in other conversion. This can increase freedom of design of haptic effects for end users.

Further, in another embodiment, a system can perform a conversion of an input signal to a haptic signal by dynamically creating and updating a range (i.e., window) that defines a portion of the input signal based on a minimum and maximum magnitude value of the input signal, and by scaling the portion of the input signal that falls within the window. This can solve a problem of a converted haptic signal not being strong enough even though an original input audio signal is perceived as being loud when played through an audio output device, such as a speaker.

Even further, in another embodiment, a system can dynamically compress a haptic signal, or haptic stream, and stream the dynamically compressed haptic signal to a haptic output device. This can be very important for storing and streaming haptic data efficiently, and can allow haptic-enabled media to be more attractive for end-users.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A computer-implemented method for dynamically converting an input signal into a haptic signal that causes a haptic output device to output one or more haptic effects, the computer-implemented method comprising:
generating a plurality of effect objects, each effect object including instructions to perform a different haptic conversion algorithm on a data signal, the effect objects being orderable in any order at runtime;
receiving the input signal including the data signal and metadata defining an order that the effect objects are applied to the data signal at runtime;
applying the effect objects to the data signal based on the order, including:
providing the data signal as an input to a first effect object in the order,
providing an output from a predecessor effect object as an input to a successor effect object in the order, and
forming the haptic signal from an output of a last effect object in the order; and
sending the haptic signal to the haptic output device,
wherein the effect objects applied to the data signal include:
an effect object that determines a threshold magnitude value by mapping the data signal to one of a plurality of bins based on a minimum amplitude value and a maximum amplitude value, each bin representing a different magnitude range and having at least one pre-defined threshold magnitude value, the pre-defined threshold magnitude value from the mapped bin being used as the threshold magnitude value, and
an effect object that applies a dynamic range compression algorithm to the data signal based on the threshold magnitude value.

2. The computer-implemented method of claim 1, further comprising at least one of:
adding an effect object to the order;
removing an effect object from the order; and
modifying a sequence of effect objects in the order.

3. The computer-implemented method of claim 1, wherein the metadata defines the effect objects.

4. The computer-implemented method of claim 1, wherein the dynamic range compression algorithm upwardly scales magnitude values of the data signal that are below the threshold magnitude value.

5. The computer-implemented method of claim 1, wherein the dynamic range compression algorithm downwardly scales magnitude values of the data signal that are above the threshold magnitude value.

6. The computer-implemented method of claim 1, wherein the data signal includes a plurality of portions, and the effect objects are applied to each portion of the data signal based on the order.

7. The computer-implemented method of claim 1, wherein the order includes at least one effect object that:
determines a round-trip duration between a server and a client;
selects a compression algorithm based on at least one of:
the round-trip duration between the server and the client; or
one or more characteristics of the haptic signal; and
compresses the haptic signal by applying the compression algorithm to the haptic signal.

8. A non-transitory computer-readable medium having instructions stored thereon that, when executed by a processor, cause the processor to dynamically convert an input signal into a haptic signal that causes a haptic output device to output one or more haptic effects, the instructions comprising:
generating a plurality of effect objects, each effect object including instructions to perform a different haptic conversion algorithm on a data signal, the effect objects being orderable in any order at runtime;
receiving the input signal including the data signal and metadata defining an order that the effect objects are applied to the data signal at runtime;
applying the effect objects to the data signal based on the order, including:
providing the data signal as an input to a first effect object in the order,
providing an output from a predecessor effect object as an input to a successor effect object in the order, and
forming the haptic signal from an output of a last effect object in the order; and
sending the haptic signal to the haptic output device, wherein the effect objects applied to the data signal include:
   an effect object that determines a threshold magnitude value by mapping the data signal to one of a plurality of bins based on a minimum amplitude value and a maximum amplitude value, each bin representing a different magnitude range and having at least one pre-defined threshold magnitude value, the pre-defined threshold magnitude value from the mapped bin being used as the threshold magnitude value, and
   an effect object that applies a dynamic range compression algorithm to the data signal based on the threshold magnitude value.

9. The non-transitory computer-readable medium of claim 8, wherein the instructions further comprise at least one of:
adding an effect object to the order;
removing an effect object from the order; and
modifying a sequence of effect objects in the order.

10. The non-transitory computer-readable medium of claim 8, wherein the metadata defines the effect objects.

11. The non-transitory computer-readable medium of claim 8, wherein the dynamic range compression algorithm upwardly scales magnitude values of the data signal that are below the threshold magnitude value.

12. The non-transitory computer-readable medium of claim 8, wherein the dynamic range compression algorithm downwardly scales magnitude values of the data signal that are above the threshold magnitude value.

13. The non-transitory computer-readable medium of claim 8, wherein the data signal includes a plurality of portions, and the effect objects are applied to each portion of the data signal based on the order.

14. The non-transitory computer-readable medium of claim 8, wherein the order includes at least one effect object that:
   determines a round-trip duration between a server and a client;
   selects a compression algorithm based on at least one of:
      the round-trip duration between the server and the client; or
      one or more characteristics of the haptic signal; and
   compresses the haptic signal by applying the compression algorithm to the haptic signal.

15. A system for dynamically converting an input signal into a haptic signal that causes a haptic output device to output one or more haptic effects, the system comprising:
the haptic output device; and
a processor, coupled to the haptic output device, configured to:
   generate a plurality of effect objects, each effect object including instructions to perform a different haptic conversion algorithm on a data signal, the effect objects being orderable in any order at runtime;
   receive the input signal including the data signal and metadata defining an order that the effect objects are applied to the data signal at runtime;
   apply the effect objects to the data signal based on the order, including:
      provide the data signal as an input to a first effect object in the order,
      provide an output from a predecessor effect object as an input to a successor effect object in the order, and
      form the haptic signal from an output of a last effect object in the order; and
   send the haptic signal to the haptic output device, wherein the effect objects applied to the data signal include:
   an effect object that determines a threshold magnitude value by mapping the data signal to one of a plurality of bins based on a minimum amplitude value and a maximum amplitude value, each bin representing a different magnitude range and having at least one pre-defined threshold magnitude value, the pre-defined threshold magnitude value from the mapped bin being used as the threshold magnitude value, and
   an effect object that applies a dynamic range compression algorithm to the data signal based on the threshold magnitude value.

16. The system of claim 15, wherein the processor is configured to:
add an effect object to the order;
remove an effect object from the order; or
modify a sequence of effect objects in the order.

17. The system of claim 15, wherein the metadata defines the effect objects.

18. The system of claim 15, wherein the dynamic range compression algorithm upwardly scales magnitude values of the data signal that are below the threshold magnitude value or downwardly scales magnitude values of the data signal that are above the threshold magnitude value.

19. The system of claim 15, wherein the data signal includes a plurality of portions, and the effect objects are applied to each portion of the data signal based on the order.

20. The system of claim 15, wherein the order includes at least one effect object that:
   determines a round-trip duration between a server and a client;
   selects a compression algorithm based on at least one of:
      the round-trip duration between the server and the client; or
      one or more characteristics of the haptic signal; and
   compresses the haptic signal by applying the compression algorithm to the haptic signal.

* * * * *